US009081836B2

(12) United States Patent
Kolli et al.

(10) Patent No.: US 9,081,836 B2
(45) Date of Patent: Jul. 14, 2015

(54) METHOD AND SYSTEM FOR IMPLEMENTING AND ACCESSING A VIRTUAL TABLE ON DATA FROM A CENTRAL SERVER

(75) Inventors: Ashish Kolli, Foster City, CA (US); Daniel ManHung Wong, Sacramento, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1696 days.

(21) Appl. No.: 10/879,266

(22) Filed: Jun. 28, 2004

(65) Prior Publication Data
US 2005/0289174 A1    Dec. 29, 2005

(51) Int. Cl.
G06F 17/30    (2006.01)
G06F 7/00    (2006.01)

(52) U.S. Cl.
CPC ................ *G06F 17/30566* (2013.01)

(58) Field of Classification Search
None
See application file for complete search history.

(56) References Cited

U.S. PATENT DOCUMENTS

| | | | |
|---|---|---|---|
| 6,078,925 A | 6/2000 | Anderson et al. | |
| 6,253,203 B1 | 6/2001 | O'Flaherty et al. | |
| 6,275,824 B1 | 8/2001 | O'Flaherty et al. | |
| 6,587,856 B1 * | 7/2003 | Srinivasan et al. | 707/102 |
| 6,694,306 B1 * | 2/2004 | Nishizawa et al. | 707/3 |
| 7,082,435 B1 | 7/2006 | Guzman et al. | |
| 7,146,356 B2 * | 12/2006 | Choi et al. | 707/3 |
| 2001/0034733 A1 * | 10/2001 | Prompt et al. | 707/102 |
| 2002/0133504 A1 * | 9/2002 | Vlahos et al. | 707/104.1 |
| 2004/0139070 A1 * | 7/2004 | Dysart et al. | 707/3 |
| 2004/0186826 A1 * | 9/2004 | Choi et al. | 707/3 |
| 2005/0080791 A1 * | 4/2005 | Ghatare | 707/100 |
| 2007/0143572 A1 * | 6/2007 | Lee et al. | 711/207 |

OTHER PUBLICATIONS

Amer-Yahia, S. et al. "Advanced XML Technologies and Applications: A Mapping Schema and Interface for XML Stores" Proceedings of the 4th International Workshop on Web Information and Data Management (WIDM '02), McLean, VA, Nov. 8, 2002, pp. 23-30.

Avnur, R. et al. "Eddies: Continuously Adaptive Query Processing" Proceedings of the 2000 ACM SIGMOD International Conference on Management of Data (SIGMOD '00), Dallas, TX, May 14-19, 2000, vol. 29, No. 2, pp. 261-272.

Carroll, J.J. et al. "Jena: Implementing the Semantic Web Recommendations" Proceedings of the 13th International World Wide Web Conference on Alternate Track Papers and Posters (WWW Alt. '04), New York, NY, May 17-22, 2004, pp. 74-83.

Dinda, P.A. et al. "Nondeterministic Queries in a Relational Grid Information Service" Proceedings of the 2003 ACM/IEEE Conference on Supercomputing (SC '03), Phoenix, AZ, Nov. 15-21, 2003, pp. 1-14.

(Continued)

*Primary Examiner* — Rehana Perveen
*Assistant Examiner* — Raheem Hoffler
(74) *Attorney, Agent, or Firm* — Vista IP Law Group, LLP

(57) ABSTRACT

A method, mechanism, and computer program product for managing, referencing, and accessing centrally managed information are disclosed. Transparency is provided to the centrally managed data by introducing a mapping system between locally expected data and the central data repository. This allows, for example, local relational database systems to transparently access information from a central LDAP directory.

46 Claims, 9 Drawing Sheets

(56) References Cited

OTHER PUBLICATIONS

Jagadish, H.V. et al. "Timber: A Native XML Database" The VLDB Journal, Dec. 2002, vol. 11, No. 4, pp. 274-291.
Mihaila, G.A. et al. "Locating and Accessing Data Repositories with WebSemantics" The VMDB Journal, Aug. 2002, vol. 11, No. 1, pp. 47-57.
Zhou, N. et al. "XML Data Mediator Integrated Solution for XML Roundtrip from XML to Relational" Proceedings of the 13th International World Wide Web Conference on Alternate Track Papers and Posters (WWW Alt. '04), New York, NY, May 17-22, 2004, pp. 424-425.

* cited by examiner

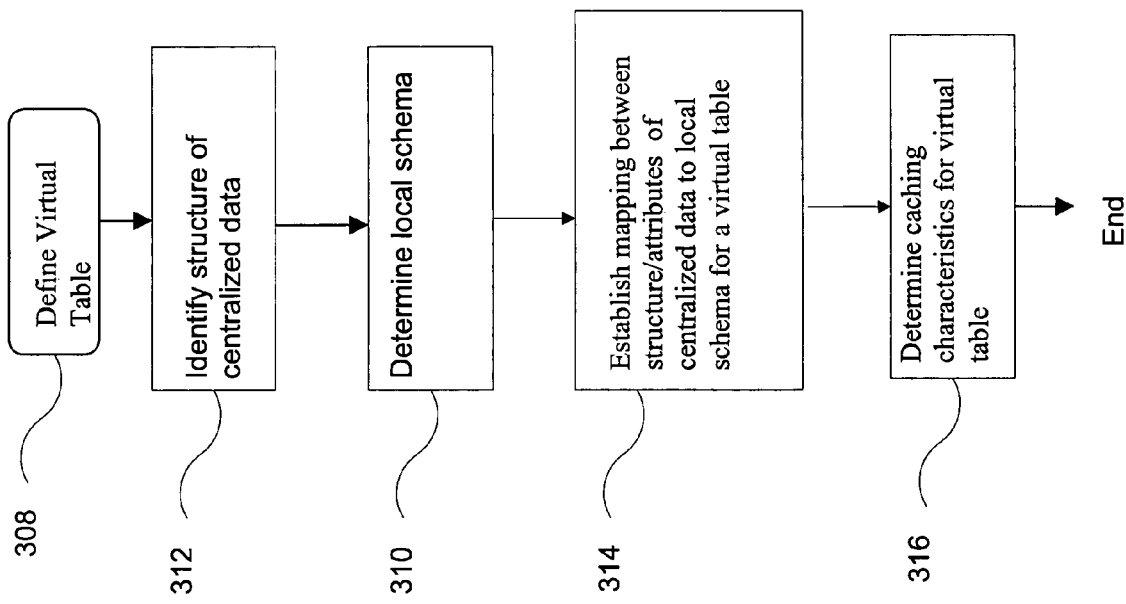

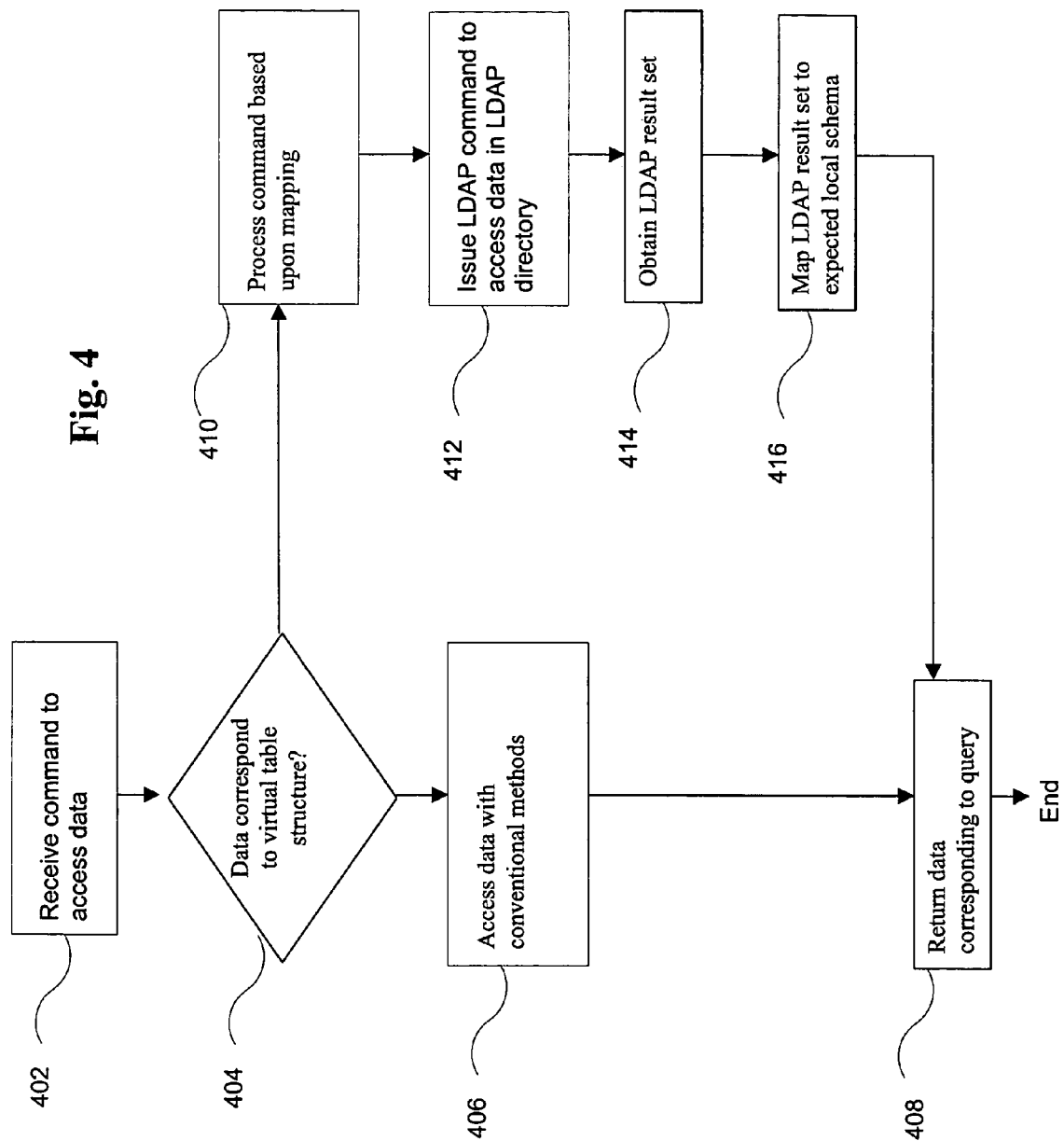

METHOD AND SYSTEM FOR IMPLEMENTING AND ACCESSING A VIRTUAL TABLE ON DATA FROM A CENTRAL SERVER

BACKGROUND AND SUMMARY

Centralized data repositories are increasingly being used to store critical enterprise-wide meta-data, such as user information, services information, and organizational information. Such centralized data repositories provide many advantages over locally maintained repositories, allowing organizations to provide more efficient and secure methods to maintain the enterprise-wide meta-data.

A common approach to implement the central data repository is to use the Lightweight Directory Access Protocol ("LDAP"), which is a directory protocol that was originally developed as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain numerous types of system and enterprise meta-data. LDAP directory systems are normally organized in a structure having entries (i.e., objects) organized in the form of a tree, which is referred to as a directory information tree ("DIT"). A unique name or ID (which is commonly called a "distinguished name" or "DN") identifies each LDAP entry in the DIT. An LDAP entry is a collection of one or more entry attributes. If structured properly, a DIT represents an explicit hierarchy.

FIG. 1 illustrates an example computing architecture having a centralized LDAP repository/directory 110 that includes system metadata. A LDAP repository 110 defines a storage model to hierarchically store data and a query protocol to access it. A number of remote nodes 112 and 116 are configured to access the data 102 in the central LDAP repository 110. The term "node" is used herein to represent any type of entity that may need to access the system meta-data, such as a server, standalone workstation, application, or instance of an application, or even smaller granularities of entities such as processes or threads.

Each of the nodes 112 and 116 require some sort of a mechanism to access the information 102 within LDAP directory 110. One approach is to maintain a local copy 120 of the required information 102 from the LDAP directory 110 in a local data repository 118, with the local copy 120 stored in an application specific local schema. In this approach, an application 114 that needs to access the system metadata would simply issue a SQL query against the local data repository 118 to access the local copy 120 of the data (assuming that the local copy 120 is in a relational database schema). Synchronization, e.g., using meta-directories, is used to maintain the correspondence between data in the local repository 118 and the central data repository 110. A problem with this approach is that such synchronization requires manual activities at the deployment site and requires computational resources from the directory integration platform. These problems may cause unacceptable levels of inefficiencies to perform the process of synchronizing the system metadata.

Another approach is to recode the application 128 at the node 116 to include a customized LDAP interface 126 to directly access the data 102 in LDAP directory 110. For example, if the application 128 is a database application, the SQL layer of the application may need to be rewritten with specialized APIs to include the LDAP interface 126. The problem with this approach is that it requires the developer of the application 128 to write and maintain custom code for the LDAP interface 126, which can be a time-consuming and in many cases, a non-trivial task because the inherent search characteristics of the LDAP interface is significantly different from the query and analysis nature of the SQL language.

Embodiments of the present invention provide an improved method, mechanism, and system for referencing and accessing centrally managed information. According to some embodiments, the invention provides transparency to the centrally managed data by introducing a mapping system between locally expected data and the central data repository. This allows, for example, local relational database systems to transparently access information from a central LDAP directory. This combines the benefits of the direct API access with that of synchronization in one simple and easy to use interface for developers.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention. The same or similar elements between figures may be referenced using the same reference numbers.

FIG. 3 shows a flowchart of a process for implementing a virtual table according to an embodiment of the invention.

FIG. 4 shows a flowchart of a process for accessing a virtual table according to an embodiment of the invention.

DETAILED DESCRIPTION

Embodiments of the present invention provide an improved method, mechanism, and system for referencing and accessing centrally managed information. According to some embodiments, the invention provides transparency to the centrally managed data by introducing a mapping system between locally expected data and the central data repository. This allows, for example, local relational database systems to transparently access information from a central LDAP directory. This combines the benefits of the direct API access with that of synchronization in one simple and easy to use interface for developers. For purposes of illustration, the present description is made with reference to specific architectural examples involving relational database systems and LDAP directories. It is noted however, that the present invention is applicable to many other types of centrally managed data and is thus not to be limited to the specific illustrative examples shown herein unless specifically claimed as such.

Figure 1:
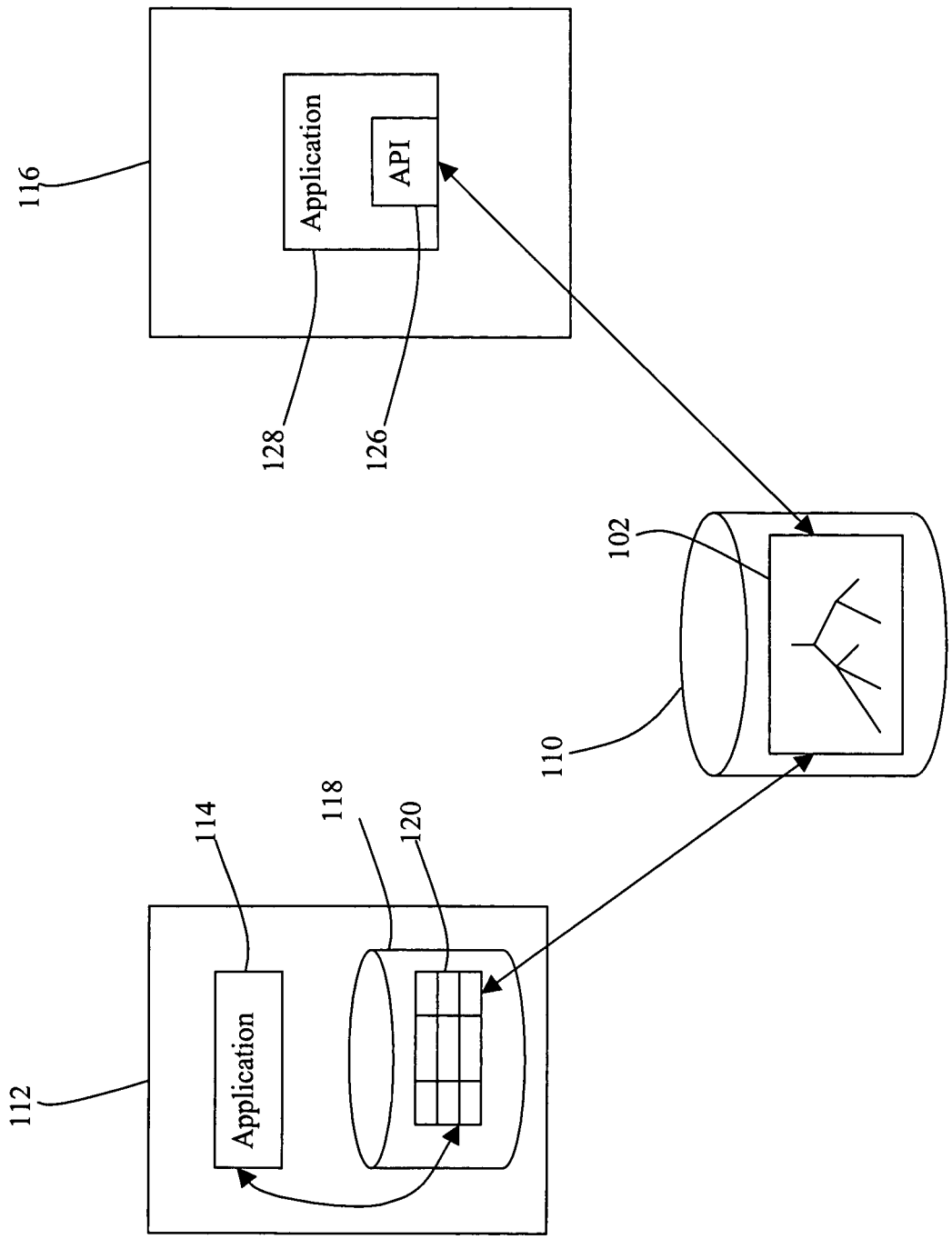
FIG. 1 illustrates approaches for accessing data associated with a central data repository.
Figure 2:
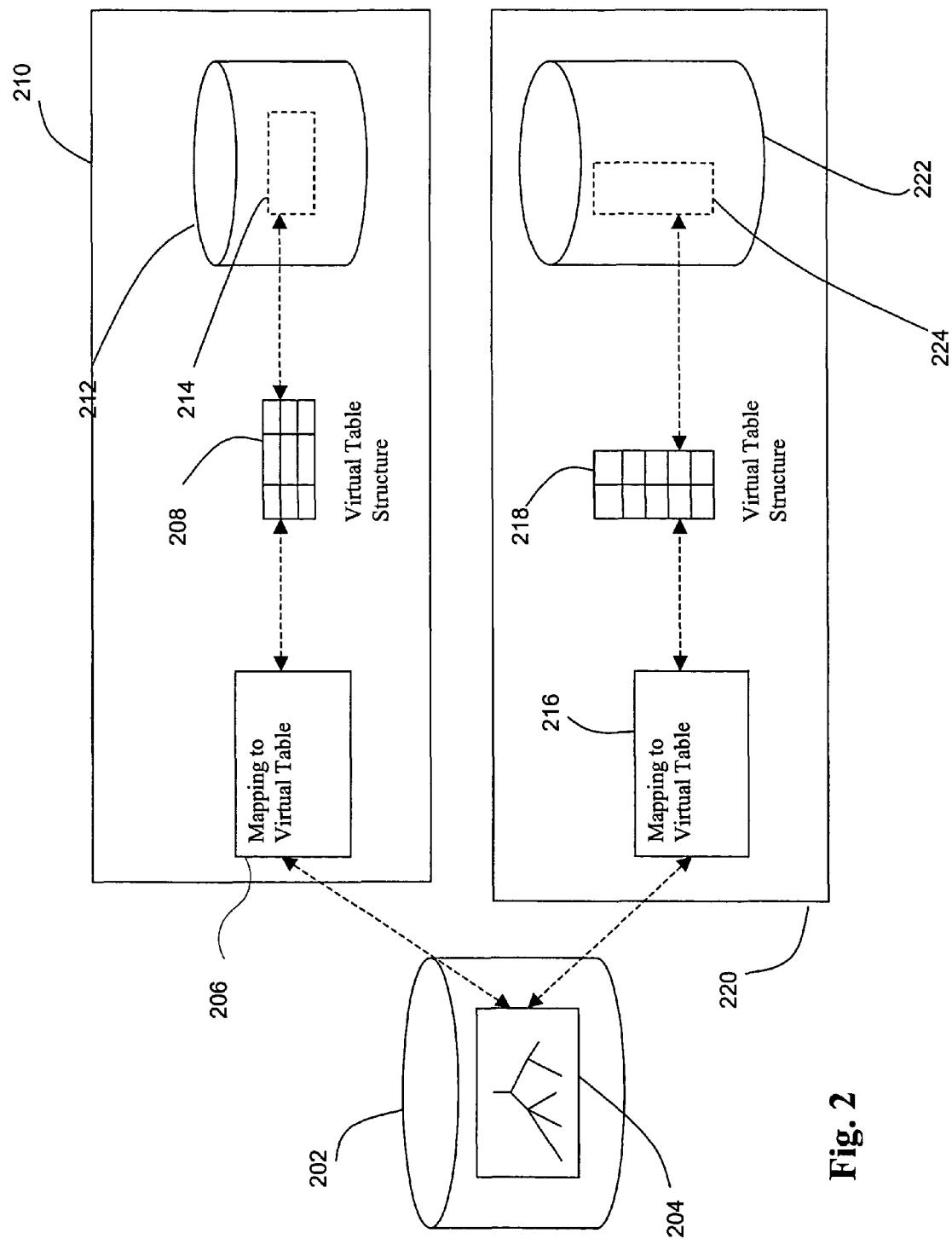
FIG. 2 illustrates an approach for implementing a virtual table according to an embodiment of the invention.

FIG. 2 illustrates an architectural overview of an embodiment of the invention. In this approach, a mapping 206 is performed between the LDAP directory 204 and columns in the table structures expected by the local relational database system 210. This mapping produces a virtual table 214 that corresponds to a virtual table structure 208, in which the virtual table structure 208 is associated with the table schema expected by the local relational database system 210, but is actually populated with data from the LDAP directory 204. When a query is made against the virtual table 214, which is defined to appear as just another table in the local data repository 212, the query is formulated with the expectations that the virtual table 214 has the schema of the virtual table structure 208. Based upon the query, the mapping system 206 automatically queries the LDAP directory 204 in the central data repository 202 to acquire the expected data and to return it in a format expected by the database system 210, making the LDAP directory 204 in the centrally managed data repository 202 behave like a real table in the local data repository 212. In one embodiment, a virtual table 214 is configured as view, or is configured similarly to a view, in which database query language commands (e.g., SQL commands) can be used to access data "virtually" contained within it.

Any number of different local nodes may concurrently co-exist and access the same central data repository, with different mappings associated with the different local applications and nodes in the distributed system. As shown in FIG. 2, another local database system 220 may have a different configuration for its mapping system 216. It can be seen that the schema of the virtual table structure 218 for database system 220 is different from the schema that for a virtual table structure 208 for database system 210 (e.g., virtual table structure 208 has three columns while virtual table structure 218 has only two columns). This means that even though both database systems 210 and 220 access the same LDAP directory 204 in the same centrally managed data repository 202, the exact mappings that are employed for each system may differ, since each system may expect to see a different type of table structure for the desired information. This allows the centrally managed data repository 202 to store its information independent of the exact needs of any particular local node/application, while allowing each system to determine the specific type and quantity of information it needs to access from the LDAP directory 204.

FIG. 3 shows a flowchart of a process for defining and implementing a virtual table according to one embodiment of the invention (308). The virtual table 214 (e.g., a materialized or non-materialized virtual table) is created as an interface to a mapping action of 314, which corresponds to a virtual table structure 208 which is the expected schema of the database table to be accessed by the local database application.

At 312, identification is made of the structure of the centrally managed data. For an architecture in which the centrally managed data is an LDAP directory, this action involved identification of the schema properties of the LDAP directory in the central data repository.

At 310, a determination is made of the expected local schema for the local system/application, which corresponds to the schema of the virtual table structure 208. For a relational database system, this action identifies, for example, the number, type, and parameters of the columns for the database table that the local database application will be expecting to access. A query criteria can be defined to correspond to the schema of the virtual table.

At 314, a mapping is established between the attributes/structure of the centrally managed data and the schema of the local database table that is expected. The mapping infrastructure provides an mechanism for performing real-time correspondence between the LDAP directory and the virtual table structure. For example, the mapping infrastructure maintains information relating one or more attributes of objects in the LDAP directory to one or more columns in the virtual table. In addition, the mapping infrastructure provides a mechanism for generating an information request to obtain data from the central data repository (e.g., a module to generate an LDAP filter). The mapping infrastructure also provides a mechanism to convert and present a data result set retrieved from the LDAP directory into the correct format usable by the local database system.

At 316, a determination is made regarding the caching characteristics of the virtual table. Caching can be implemented at the local nodes to improve performance when querying against the local virtual table. In this approach, some or all of the data corresponding to a virtual table can be cached at the local node. When a query is issued against the virtual table, responsive data that have been persisted at the local node can be immediately returned to the application, thereby greatly improving the response time for the query. In addition, indexes can be defined upon data/views that are structured in this manner. The local node can establish "aging" parameters to determine the persistency of the cached data. Any suitable caching algorithms may be employed in the invention to facilitate action 316.

FIG. 4 shows a flowchart of a process for accessing centrally managed data according to an embodiment of the invention. This process takes advantage of the fact that once a virtual table has been defined over the LDAP directory, the data can be accessed as if the data exists locally. At 402, a command is issued to access the data. Any type of access can be made against the data, so long as the form of access is supported by the mapping system. A first example type of access is to issue a query against the data. A second example type of access is to issue an update command against the data.

A determination is made whether the object being queried corresponds to a virtual table (404). If not, then conventional approaches are used to access the data (406). If the object being queried corresponds to a virtual table (e.g., because it is a virtual table defined against a virtual table structure that is mapped to the LDAP directory), then the mapping system takes the command and performs the necessary operations to execute the command against the LDAP server (410). For example, for an update command, the correct LDAP instructions are issued to update/modify the LDAP attributes/objects being updated (412). For a query command, the appropriate LDAP query is issued to obtain the requested information (412).

If the command is of the type to produce a result set (e.g., a SQL query), then the LDAP result set is obtained at 414. The LDAP result set is mapped to the expected local schema (416) and is returned to the requesting entity at (408).

Figure 5A:
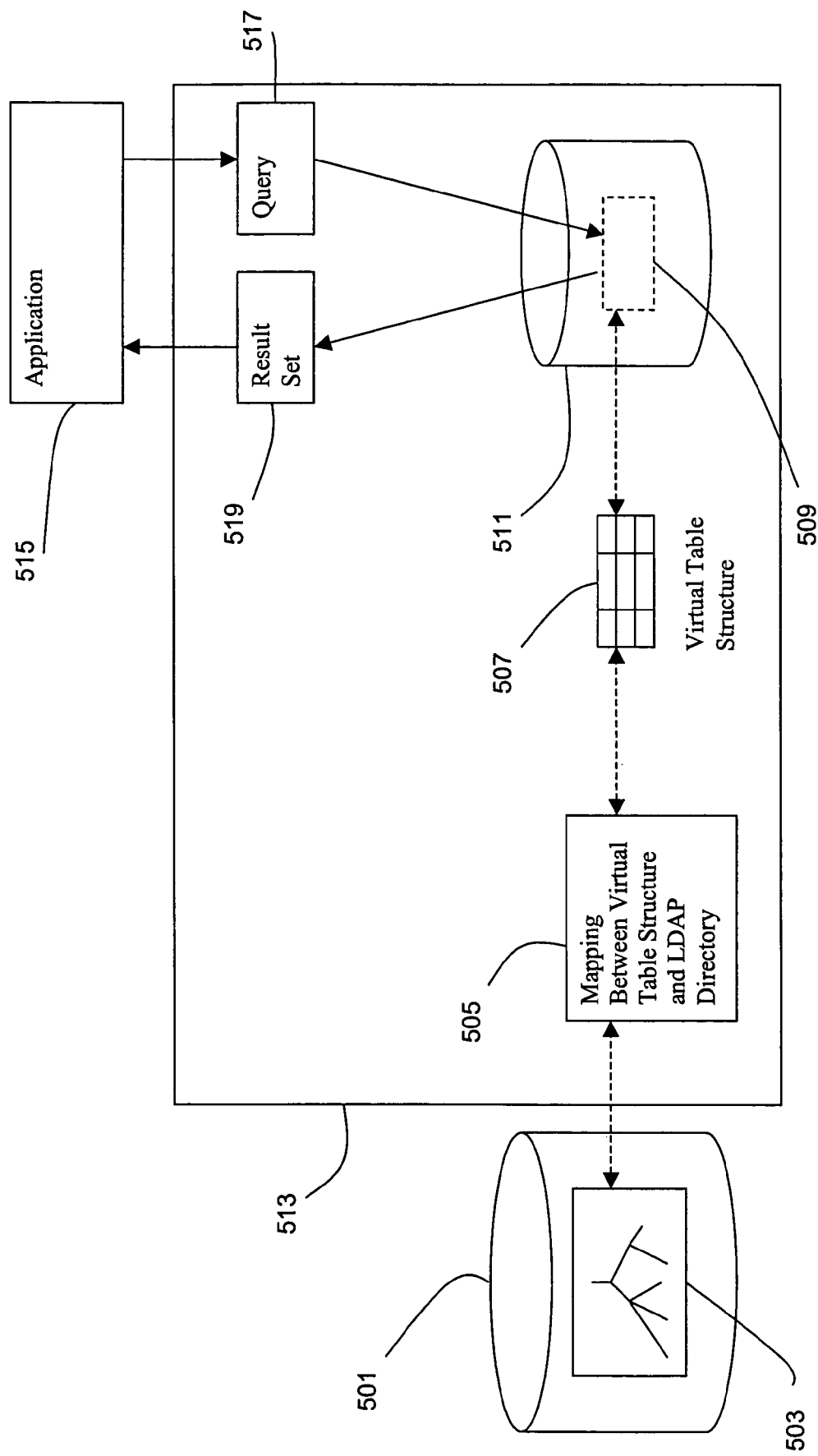
FIGS. 5A and 5B illustrate a process for querying against a virtual table according to an embodiment of the invention.

FIG. 5A provides an illustration of the process for querying centrally managed data according to an embodiment of the invention. A virtual table 509 has been defined for a local data repository 511 that is accessed by the database server 513. The virtual table 509 corresponds to data 503 that needs to be accessed by an application 515. The underlying data 503 is actually stored within an LDAP server 501 which is accessed using the LDAP protocol. The virtual table 509 has been defined according to a virtual table structure 507. A mapping infrastructure 505 is employed to perform real-time mapping between the LDAP directory 503 and virtual table structure 507 that is associated with the virtual table 509.

When the data is needed by the application 515, a SQL query 517 is issued against the virtual table 509. The SQL query 517 is composed in a format that expects a schema for virtual table 509 that corresponds to the virtual table structure 507. The mapping infrastructure 505 maps the SQL query into the appropriate LDAP commands to retrieve the requested information from the LDAP directory 503. The mapping infrastructure will receive the retrieved LDAP information and convert it into the appropriate format as if the data was actually retrieved from a table having the virtual table structure 507. Therefore, the query to the virtual table 509 will produce a result set 519 that essentially appears like any other row source in the database system 513.

Figure 5B:
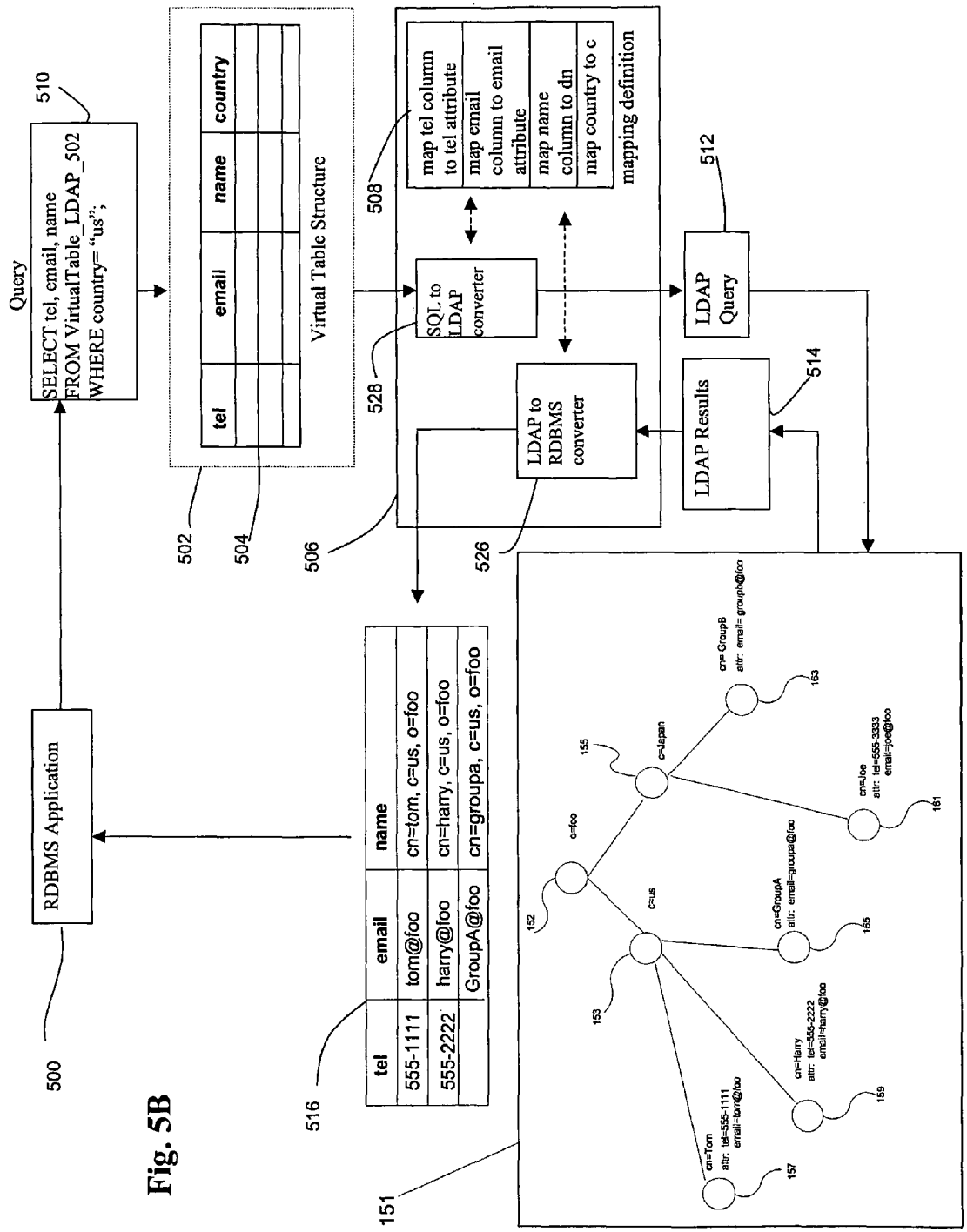

FIG. 5B provides a more detailed illustration of the processes according to an embodiment of the invention. Shown in this figure is an example LDAP directory information tree (DIT) 151, which is hierarchically organized based upon geographic location. Entry 152 is the topmost level of DIT 151a and identifies the DIT portion 151a as pertaining to an organization "Foo" (o=Foo). Entry 152 is the "parent" entry for two "child" entries 153 and 155 directly beneath it in DIT 151a. Each of these entries corresponds to a geographical location. Specifically, entry 153 corresponds to the geographic location "c=US" and entry 155 corresponds to the geographic location "c=Japan". The entries for each user/person in the Foo organization are located as child entries to either entry 153 or 155, depending upon their specific geographic location.

Here, users "Tom" and "Harry" are located in the US; therefore, the individual entries 157 and 159 for these users are located beneath entry 153 (c=US) in DIT 151a. The distinguished name ("DN") for cn=Tom would therefore be "cn=Tom, c=US, o=Foo" and the distinguished name for cn=Harry would be "cn=Harry, c=US, o=Foo". Tom is identified as having the attributes "tel" with the value "555-1111" and the attribute "email" with the value "tom@foo". Harry is identified as having the attributes "tel" with the value "555-2222" and the attribute "email" with the value "harry@foo". GroupA (entry 165) is also located in the US and is associated with the distinguished name "cn=GroupA, c=US, o=Foo", and having the attribute "email" with the value "groupa@foo".

User "Joe" is located in Japan; therefore, the individual entry 161 for this user is located beneath the entry 155 (c=Japan) in DIT 151a. The distinguished name for Joe is "cn=Joe, c=Japan, o=Foo". Joe is identified as having the attributes "tel" with the value "555-333" and the attribute "email" with the value "joe@foo". GroupB (entry 163) is also located in Japan and is associated with the distinguished name "cn=GroupB, c=US, o=Foo", and having the attribute "email" with the value "groupb@foo".

Initially, a virtual table 502 is defined having a virtual table schema 504 that is expected by an application 500 in the local database system. In this example, the virtual table 502 is defined having a virtual table schema 504 with four columns, including a "name" column, a "tel" column, and an "email" column, and a "country" column. The mapping infrastructure 506 includes a detailed mapping 508 between attributes/entries/objects in the LDAP directory 151 and columns in the virtual table schema 504. In this example, detailed mapping 508 would associate the email column with the LDAP email attribute, the tel column 505a with the LDAP tel attribute, the name column 505c with the DN of an object in the LDAP directory 151, and the country column hierarchically with the country to which an entry in the LDAP DIT 151 belongs.

When the application 500 issues a query 510 against the virtual table 502, a SQL to LDAP converter 528 converts the query 510 into the appropriate LDAP query 512 to resolve the query 510. In real-time, the LDAP query 512 is applied to the LDAP directory 151. The LDAP results 514 responsive to the LDAP query 512 is retrieved from the LDAP directory 151. A LDAP to RDBMS converter 526 converts the LDAP results 514 into the appropriate format 516 that is suitable to be used by the application 500. It is note that the LDAP directory may be stored in a relational database. If the LDAP directory 151 is stored in a relational database, then the conversion process does not need to convert from SQL to LDAP. Instead, the SQL query 510 would be converted into an equivalent SQL query for the schema of the storage structure for the LDAP directory, and the responsive data 514 would not need to be converted back into a relational format.

In the present example, assume that the SQL query 510 has the following details:
SELECT tel, email, name
FROM VirtualTable_LDAP_502
WHERE country="us";
This query 510 seeks the contents of the telephone number column, email column, and name column for each row in the virtual table 502 in which the row corresponds to a value in the country column that is equal to "us".

Based upon the mapping definition 508, the SQL-to-LDAP converter 528 will convert this SQL statement 528 into the appropriate LDAP query 512 to obtain the desired information. The mapping definition contains the information required to map specific columns from virtual table 502 that is accessed by query 510 to the specific structures in the LDAP directory 151 that correspond to those columns.

The LDAP query 512 will retrieve LDAP results 514 the LDAP directory 151. For the example query 510 shown in FIG. 5B that includes a "WHERE" clause that seeks all entries corresponding to the country "us", the information that would be responsive to the LDAP filter would be information about the entries 157, 159, and 165 that are child entries to the "c=us" entry 153 in DIT 151. The LDAP results 514 would be in the format that is produced by the configuration of the LDAP filter/data.

Based upon the mapping definition 508 and the original query 510, the LDAP-to-RDBMS converter 526 will convert the raw LDAP results 514 into a relational format that is usable by the application 500. In this particular example, a set of rows would be produced in the converted result set 516 shown in FIG. 5B, which is the RDBMS translation of the desired tel, email, and name information from entries 157, 159, and 165 of DIT 151. This set of rows would then be returned to the application 500.

Under certain circumstances, the format and structure of the LDAP data may significantly differ from the format and structure of expected relational data. If this occurs, then the mapping infrastructure will extend the normal relational structure of the data to address the different format/structure of the LDAP data. This action can be performed automatically or manually. As just one example, consider the situation involving multi-valued LDAP attributes, e.g., a person or entry in the LDAP directory having multiple different email addresses or telephone numbers. One approach to resolve this circumstance is to provide a different row for each of the different LDAP attributes that match to the same column in the relational schema. In a different approach, if only a single row is to be provided to correspond to the multi-valued LDAP attribute, then nested tables can be used to represent the data. These actions can be automatically taken (e.g., based upon heuristic analysis of the best approach to take), or else the action can be taken manually by an entity that has the knowledge of the circumstances and the intended effects.

Figure 7:
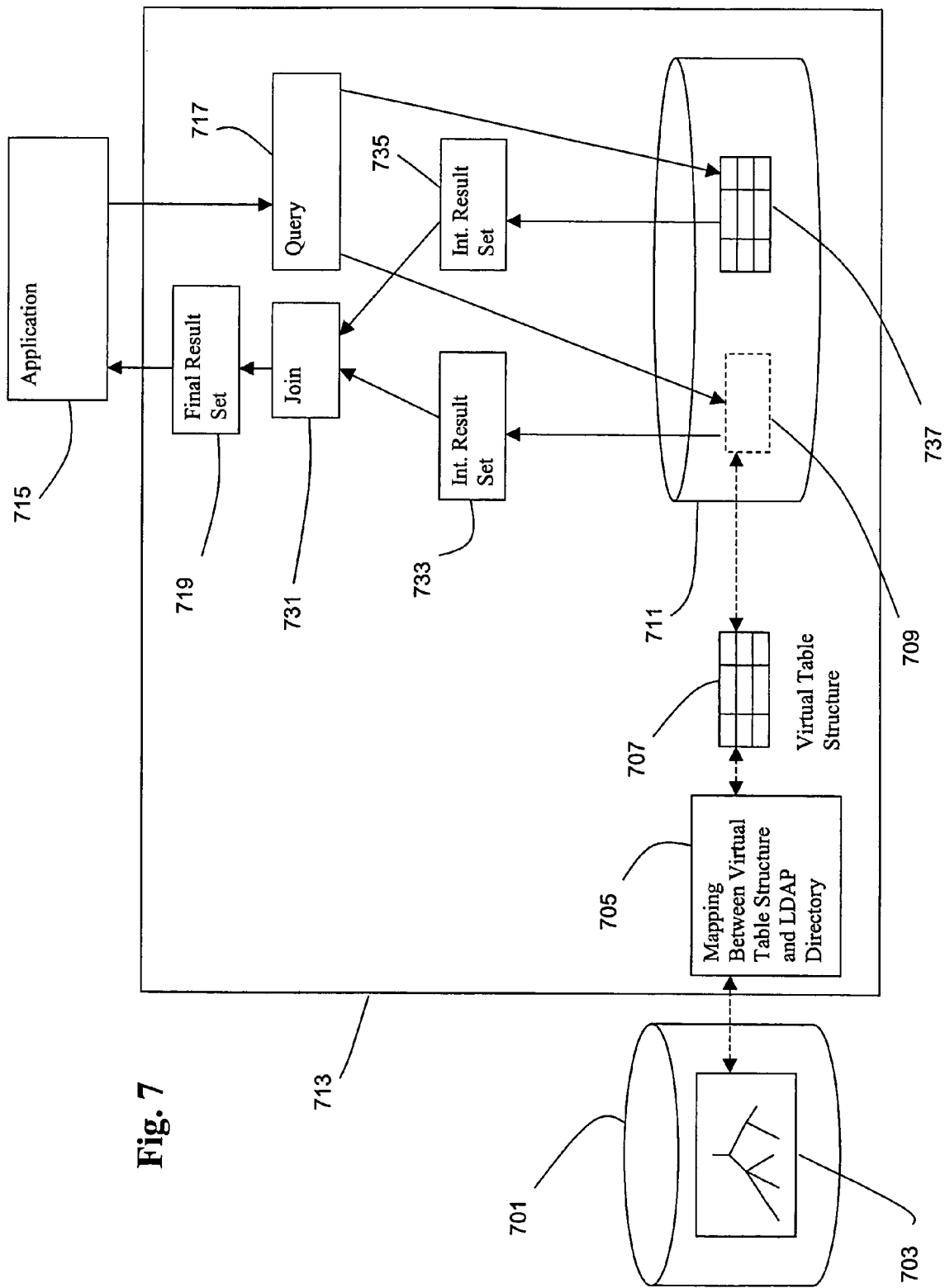
FIG. 7 illustrates a process for performing a join operation involving a virtual table according to an embodiment of the invention.

Since the data retrieved from a virtual table is like any other data retrieved from a local table or row source, it can be manipulated using any of the existing query operations. For example, the result set from the virtual table can undergo a join operation with other row sources. FIG. 7 graphically shows the process of performing a join operation between data retrieved from a local source table and centrally managed data retrieved from the virtual table. A normal relational table 737 has been formed within local data repository 711. In addition, a virtual table 709 has been defined with respect to the local data repository 711 accessed by the database server 713. The underlying data 703 is actually stored within an LDAP server 701. The virtual table 709 has been defined according to a virtual table structure 707. A mapping infrastructure 705 is employed to perform real-time mapping between the LDAP directory 703 and virtual table structure 707 that is associated with the virtual table 709.

To illustrate this aspect of the present embodiment, assume that the application 715 has issued a query 717 having the following form:
SELECT*
FROM Virtual_Table_709, Normal_Table_737
WHERE Virtual_Table_709.name="Joe"
    AND Normal_Table_737.email="joe@foo";
This SQL query 717 seeks all rows from both the normal table 737 and the virtual table 709 in which the value of the email column in the normal table 737 has the value "joe@foo" and the value of the virtual name column in the virtual table 709 has the value "Joe". To satisfy the WHERE clause of this query, a join operation is performed between the intermediate result set 735 obtained from the normal table 737 and the intermediate result set 733 obtained from the virtual table 709.

To obtained the intermediate result set 735 from the normal table 737, the appropriate portion of the SQL query 717 is executed with the suitable access path to retrieve the requested information from the normal table 737. A set of zero or more rows are produced as a result of the this operation, forming the intermediate result set 735.

To obtain the intermediate result set 733 from the virtual table 709, the mapping infrastructure 505 maps the appropriate SQL query 717 into the appropriate LDAP commands to retrieve the requested information from the underlying LDAP server 703. The mapping infrastructure will receive the retrieved LDAP information and convert it into the appropriate format as if the data was actually retrieved from a table having the virtual table structure 707. This produces the intermediate result set 733.

Since the intermediate result set 733 from the virtual table 709 essentially appears like any other row source in the database system 713, a join operation 731 can be performed between intermediate result set 733 and the intermediate results et 735 from the normal table 737. The result of this join operation 731 produces the final result set 719 which is thereafter returned to the application 715.

Figure 6:
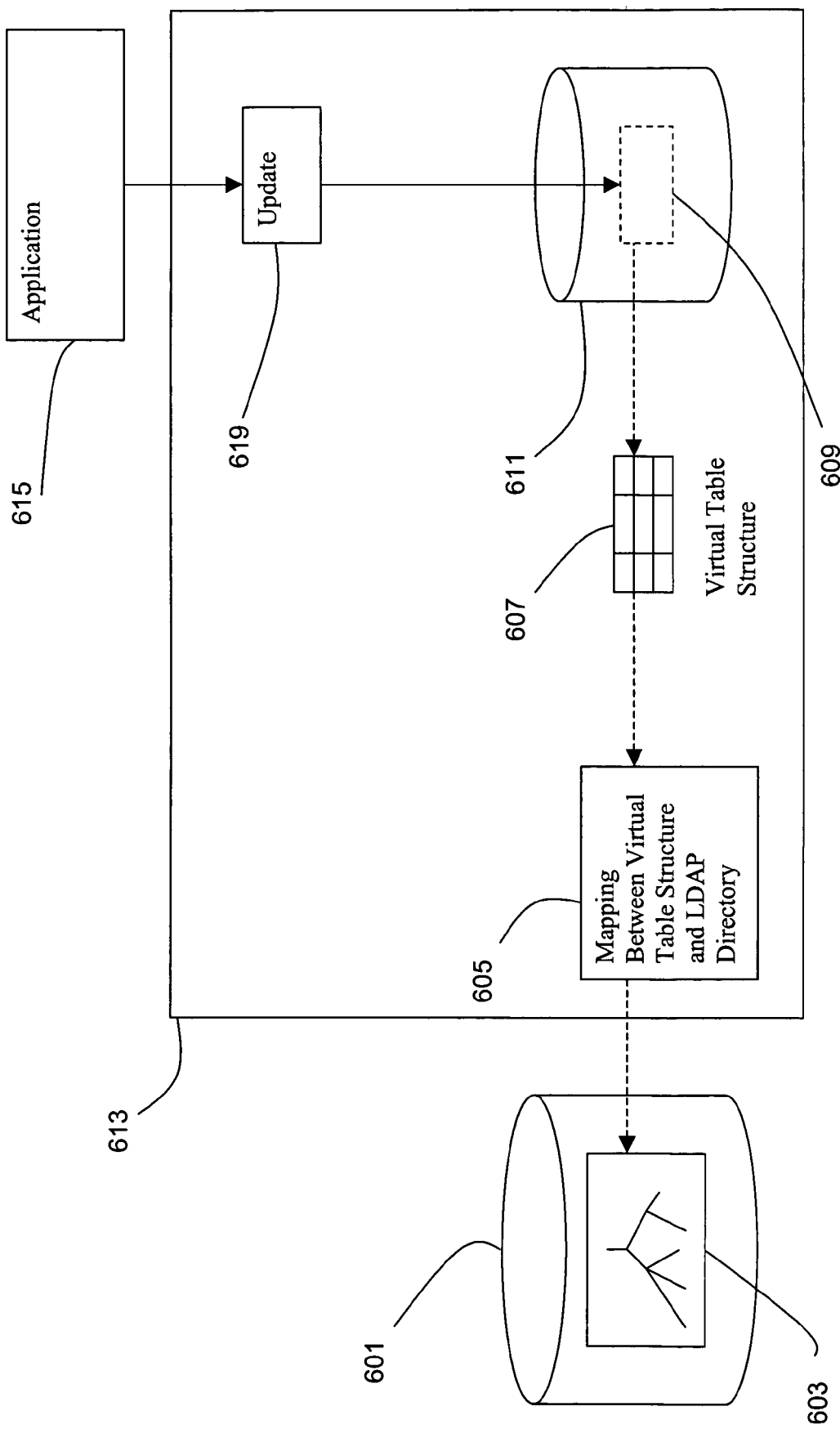
FIG. 6 illustrates a process for updating a virtual table according to an embodiment of the invention.

FIG. 6 graphically shows the process of updating the centrally managed data. A virtual table 609 has been defined for a local data repository 611 accessed by the database server 613. The virtual table 609 corresponds to data that needs to be accessed by an application 615. The data 603 is actually stored within an LDAP server 601. The virtual table 609 has been defined according to a virtual table structure 607. A mapping infrastructure 605 is employed to perform real-time mapping between the LDAP directory 603 and virtual table structure 607 that is associated with the virtual table 609.

When the data is to be updated by the application 615, an update statement 619 is issued against the virtual table 609.

The update statement 619 is composed in a format that expects a schema for virtual table 609 that corresponds to the virtual table structure 607.

The mapping infrastructure 605 maps the update statement 619 into the appropriate LDAP semantics to update the requested information at the LDAP server 601. This action involves taking information regarding the data to be updated in a first format (e.g., in the relational format) and converting it to the LDAP schema, based upon knowledge of the specific objects, entries, and attributes to be updated. One approach for implementing this action is to perform the action of inferring where in the LDAP tree the actual update operation is to be performed. Mapping routes can be established to identify the specific portions of the LDAP hierarchical tree that is to be modified. In addition, hints or pragmas can be used to identify default attributes to use for the update operation. This can be used to drive selection of the particular profiles/attributes affected by the operation based upon column values of data that is to be added or updated.

The present embodiment provides a process for preserving transactional semantics for updates upon the virtual table. To preserve transactional integrity, the update operation must be completed at all the required data locations before the operation can be truly "committed." One approach for implementing this is to employ transaction identifiers, and to pass the transaction identifier through the different systems during the update operation. The transaction identifier would be preserved thorough the different phases of the update operations. The action of committing the update operation would actually occur after the server has confirmed the receipt of the transaction identifier after it has passed through each phase of the entire operation and has been returned back to the server.

System Architecture Overview

Figure 8:
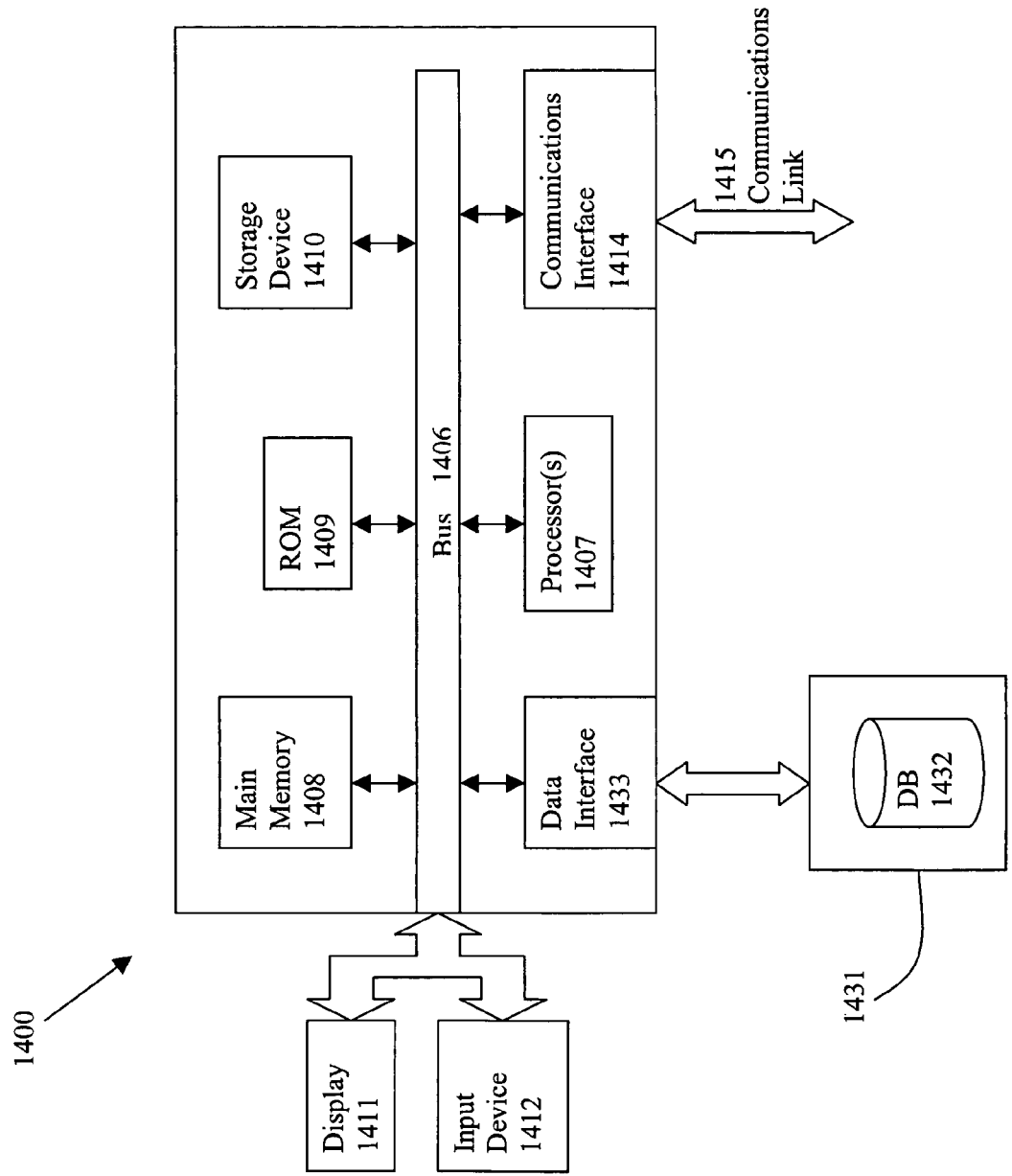
FIG. 8 is a diagram of a computer system with which the present invention can be implemented.

The execution of the sequences of instructions required to practice the invention may be performed in embodiments of the invention by a computer system 1400 as shown in FIG. 8. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for accessing a virtual table, in which the virtual table corresponds to data that is centrally stored at a central storage location, comprising:
   receiving a command with a format compliant with a schema for the virtual table at a database, wherein the schema for the virtual table comprises rows and columns;
   mapping the command to a converted command, wherein the converted command has a command format appropriate for the central storage location, wherein the act of mapping is performed using a processor; and
   issuing the converted command to the central storage location to access the data from the central storage location underlying the virtual table;
   wherein the data is stored in the central storage location independent of the schema for the virtual table.

2. The method of claim 1 in which the command is a query.

3. The method of claim 2 further comprising:
   obtaining a first result set in a first form corresponding to the central storage location;
   mapping the first result to a second result in form corresponding to a local node; and
   returning the second result.

4. The method of claim 2 in which the query comprises a SQL query.

5. The method of claim 3 further comprising: converting from an LDAP semantic for the first result to a relational semantic for the second result.

6. The method of claim 5 in which the second result corresponds to intermediate data that operated upon by the query.

7. The method of claim 6 in which a join operation is performed upon the intermediate data.

8. The method of claim 1 in which the command comprises an update command.

9. The method of claim 8 in which the data is updated at the central storage location.

10. The method of claim 8 in which the command is mapped to LDAP semantics.

11. The method of claim 10 in which a mapping route is used to identify a portion of an LDAP directory to access to perform the update command.

12. The method of claim 10 in which a hint or pragma is used to select a profile or attribute for the update.

13. The method of claim 8 in which transactional semantics are preserved.

14. The method of claim 13 in which a transactional identifier is used, wherein a commit does not occur for the command until the transaction identifier is appropriately returned to the local node.

15. A computer program product comprising a computer usable medium having executable code to execute a process for accessing a virtual table, in which the virtual table corresponds to data that is centrally stored at a central storage location, the process comprising:
receiving a command with a format compliant with a schema for the virtual table at a database, wherein the schema for the virtual table comprises rows and columns;
mapping the command to a converted command, wherein the converted command has a command format appropriate for the central storage location; and
issuing the converted command to the central storage location to access the data from the central storage location underlying the virtual table;
wherein the is stored in the central storage location independent of the schema for the virtual table.

16. The computer program product of claim 15, wherein the process further comprises:
obtaining a first result set in a first form corresponding to the central storage location;
mapping the first result to a second result in form corresponding to a local node; and
returning the second result.

17. The computer program product of claim 15, wherein the process further comprises:
converting from an LDAP semantic for the first result to a relational semantic for the second result.

18. The computer program product of claim 15 in which the second result corresponds to intermediate data that operated upon by the query.

19. A computer-implemented system for accessing a virtual table, in which the virtual table corresponds to data that is centrally stored at a central storage location, comprising:
means for receiving a command with a format compliant with a schema for the virtual table at a database, wherein the schema for the virtual table comprises rows and columns;
means for mapping the command to a converted command, wherein the converted command has a command format appropriate for the central storage location, wherein the means for mapping comprises a processor, and wherein the data is stored in the central storage location independent of the schema for the virtual table; and
means for issuing the converted command to the central storage location to access the data from the central storage location underlying the virtual table.

20. The system of claim 19 further comprising:
means for obtaining a first result set in a first form corresponding to the central storage location;
means for mapping the first result to a second result in form corresponding to a local node; and
means for returning the second result.

21. The system of claim 19 further comprising:
means for converting from an LDAP semantic for the first result to a relational semantic for the second result.

22. The system of claim 19 in which the second result corresponds to intermediate data that operated upon by the query.

23. A method involving use of a virtual table at a local node, the virtual table corresponding to data that is centrally stored at a central storage location independent of a schema for the virtual table, comprising:
receiving at the local node a command with a format that is compliant with the schema for the virtual table, wherein the schema for the virtual table comprises rows and columns;
in response to the received command, determining a converted command using a processor based at least in part on a mapping between the schema for the virtual table at the local node and a structure for the data that is centrally stored at the central storage location; and
issuing the converted command to the central storage location to access the data.

24. The method of claim 23 in which the schema is based upon query criteria.

25. The method of claim 23 in which the schema is based upon a number, type, and parameters of the columns for DB table.

26. The method of claim 23 in which the data is stored in the LDAP protocol and the central storage location comprises a LDAP directory.

27. The method of claim 23 in which the data is mapped to multiple virtual tables.

28. The method of claim 27 in which the multiple virtual tables correspond to different schemas.

29. The method of claim 23 in which the virtual table corresponds to a view.

30. The method of claim 23 in which the data comprises enterprise-wide metadata.

31. The method of claim 30 in which the metadata comprises user information, services information, or organizational information.

32. The method of claim 23, further comprising determining a caching characteristic for the virtual table at the local node.

33. The method of claim 32 in which the caching characteristics is determined by default.

34. The method of claim 32 in which the caching characteristics corresponds to no caching.

35. The method of claim 32 in which the caching characteristics corresponds to persistence of some or all of the data at the local node.

36. The method of claim 35 in which an index is formed against the data that is persisted at the local node.

37. A computer program product comprising a volatile or non-volatile computer usable medium having executable code to execute a process that involves use of a virtual table at a local node, the virtual table corresponding to data that is centrally stored at a central storage location independent of a schema for the virtual table, the process comprising:
receiving at the local node a command with a format that is compliant with the schema for the virtual table, wherein the schema for the virtual table comprises rows and columns;
in response to the received command, determining a converted command using a processor based at least in part on a mapping between the schema for the virtual table at the local node and a structure for the data that is centrally stored at the central storage location; and
issuing the converted command to the central storage location to access the data.

38. The computer program product of claim 37 in which the data is stored in the LDAP protocol and the central storage location comprises a LDAP directory.

39. The computer program product of claim 37 in which the virtual table corresponds to a view.

40. The computer program product of claim 37, wherein the process further comprises determining a caching characteristic for the virtual table at the local node.

41. The computer program product of claim 38 in which the caching characteristics corresponds to persistence of some or all of the data at the local node.

42. A system for executing a process that involves use of a virtual table at a local node, the virtual table corresponding to data that is centrally stored at a central storage location independent of a schema for the virtual table, the system comprising:

means for receiving at the local node a command with a format that is compliant with the schema for the virtual table, wherein the schema for the virtual table comprises rows and columns;

a processor for, in response to the received command, determining a converted command based at least in part on a mapping between the schema for the virtual table at the local node and a structure for the data that is centrally stored at the central storage location; and means for issuing the converted command to the central storage location to access the data.

43. The system of claim 42 in which the data is stored in LDAP protocol and the central storage location comprises a LDAP directory.

44. The system of claim 42 in which the virtual table corresponds to a view.

45. The system of claim 42, further comprising means for determining a caching characteristic for the virtual table at the local node.

46. The system of claim 45 in which the caching characteristics corresponds to persistence of some or all of the data at the local node.

* * * * *

UNITED STATES PATENT AND TRADEMARK OFFICE
CERTIFICATE OF CORRECTION

| | | |
|---|---|---|
| PATENT NO. | : 9,081,836 B2 | |
| APPLICATION NO. | : 10/879266 | |
| DATED | : July 14, 2015 | |
| INVENTOR(S) | : Kolli et al. | |

It is certified that error appears in the above-identified patent and that said Letters Patent is hereby corrected as shown below:

In the Specification

In column 7, line 38, delete "the this" and insert -- this --, therefor.

Signed and Sealed this
Twenty-first Day of June, 2016

Michelle K. Lee
*Director of the United States Patent and Trademark Office*